(12) United States Patent
Chiu et al.

(10) Patent No.: US 6,915,419 B2
(45) Date of Patent: Jul. 5, 2005

(54) USB INTERFACE CONTROLLER CHIP

(75) Inventors: Yen-Chang Chiu, Taipei (TW); Kao-Pin Wu, Hsinchu (TW); Ting-Hao Yeh, Tainan (TW); Ming-Chuan Lo, Hsinchu (TW)

(73) Assignee: Elan Microelectronics Corporation, Hsin-Chu (TW)

( * ) Notice: Subject to any disclaimer, the term of this patent is extended or adjusted under 35 U.S.C. 154(b) by 0 days.

(21) Appl. No.: 10/335,934

(22) Filed: Jan. 3, 2003

(65) Prior Publication Data

US 2003/0135673 A1 Jul. 17, 2003

(30) Foreign Application Priority Data

Jan. 16, 2002 (TW) ..................................... 91200393 U

(51) Int. Cl.[7] .............................................. G06K 7/08
(52) U.S. Cl. ............................. 713/2; 710/15; 710/62; 710/63; 710/72
(58) Field of Search ................................ 713/2; 710/15, 710/62, 63, 72

(56) References Cited

U.S. PATENT DOCUMENTS

| | | | |
|---|---|---|---|
| 6,131,134 A | * | 10/2000 | Huang et al. ............... 710/302 |
| 6,370,603 B1 | * | 4/2002 | Silverman et al. ............ 710/72 |
| 6,543,690 B2 | * | 4/2003 | Leydier et al. ............. 235/451 |
| 6,629,169 B2 | * | 9/2003 | Chu ............................ 710/72 |

* cited by examiner

*Primary Examiner*—A. Elamin
(74) *Attorney, Agent, or Firm*—Rosenberg, Klein & Lee

(57) ABSTRACT

A USB interface controller chip comprises a pair of signal ports for being connecting with a pair of USB signals and a power node for being connecting with a supply voltage characterized in that the controller chip is built-in with a pull-up resistor connected between the power node and one of the pair of signal ports, and the pull-up resistor has a resistance consistent to USB standard but has a tolerance larger than that defined by USB specification.

9 Claims, 2 Drawing Sheets

USB INTERFACE CONTROLLER CHIP

FIELD OF THE INVENTION

The present invention relates generally to an apparatus for supporting USB interfaces, and more particularly to a USB interface controller chip with a built-in pull-up resistor.

BACKGROUND OF THE INVENTION

USB is a standard interface for connections or communications of computer systems with its peripherals, which is divided into low-speed devices and full-speed devices. FIG. 1 illustrates a connection manner of USB low-speed device, of which a host computer 10 and a USB low-speed device controller chip 12 are connected together by a cable 14 with connections of the respective D+ ports 16 and 20, and D− ports 18 and 22. There are two pull-down resistors Rpd of 15 KΩ connected from the D+ and D− ports 16 and 18 to ground, respectively, at the host computer 10 side as well as a pull-up resistor $R_{pu}$ of 1.5 KΩ connected between the D− signal port 22 and a supply voltage of 3.3 V at the USB low-speed device controller chip 12 side. On the other hand, there is a difference between the USB full-speed device and the low-speed device in that the pull-up resistor $R_{pu}$ for the USB full-speed device is connected to the D+ signal port, instead of the D− signal port as in the manner for the USB low-speed device shown in FIG. 1.

The USB specification defines the pull-up resistor $R_{pu}$ of 1.5 KΩ with a tolerance not larger than 5%. The widely used ¼ Watts carbon film resistor has a resistance tolerance thereof just meet 5%. However, the USB low-speed device controller chip 12 together with an external pull-up resistor $R_{pu}$ results in a higher cost, and the controller chip 12 needs to be provided with one additional pin for connection of the external pull-up resistor $R_{pu}$ and thus not only increasing the cost, but also increasing the possibility of being damaged by electro-static discharge (ESD). In addition to the cost down of the device manufacturer, the pin count on the chip package will be decreased by one and thereby is decreased the possibility of ESD damages if the pull-up resistor $R_{pu}$ could be integrated within a single chip. Nevertheless, the polysilicon resistor formed by the normal semiconductor processes in combination with the temperature drift may have a tolerance approximately ranged from 10% to 20%, it is therefore difficult for the pull-up resistor $R_{pu}$ to be built in a single chip to satisfy the USB specification requirement, unless special and thus expensive process is used.

In consideration of the definition for the pull-up resistor $R_{pu}$ in the USB specification, it is realized that the main function of that resistor $R_{pu}$ is to identify a connected device is a USB full-speed one or a low-speed one depending upon which signal between D+ and D− signals is pulled high (logic "1") as the USB device is plugged in a system. In terms of this aspect, it is noted that it will not destroy the normal operation of a system as long as the voltage divided by the pull-up resistor $R_{pu}$ of 1.5 KΩ and the pull-down resistor $R_{pd}$ of 15 KΩ will not result in a misjudgment of high level by digital logic, even though the pull-up resistor $R_{pu}$ has a larger tolerance range than the USB definition.

It is therefore desired a chip integrated with a USB pull-up resistor.

SUMMARY OF THE INVENTION

One object of the present invention is to provide a USB interface controller chip integrated with a pull-up resistor without violating the consistence to USB transmission scheme, in which the pull-up resistor built in the controller chip could have a tolerance range larger than that defined by USB specification.

According to the present invention, a USB interface controller chip comprises a pair of D+ and D− signal ports for being connected to the USB ports of a host computer, a power node for connecting with a supply voltage, and a pull-up resistor built in the controller chip and connected between one of the pair of signal ports and the power node. The built-in pull-up resistor has a resistance tolerance typically up to or more than 20%.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
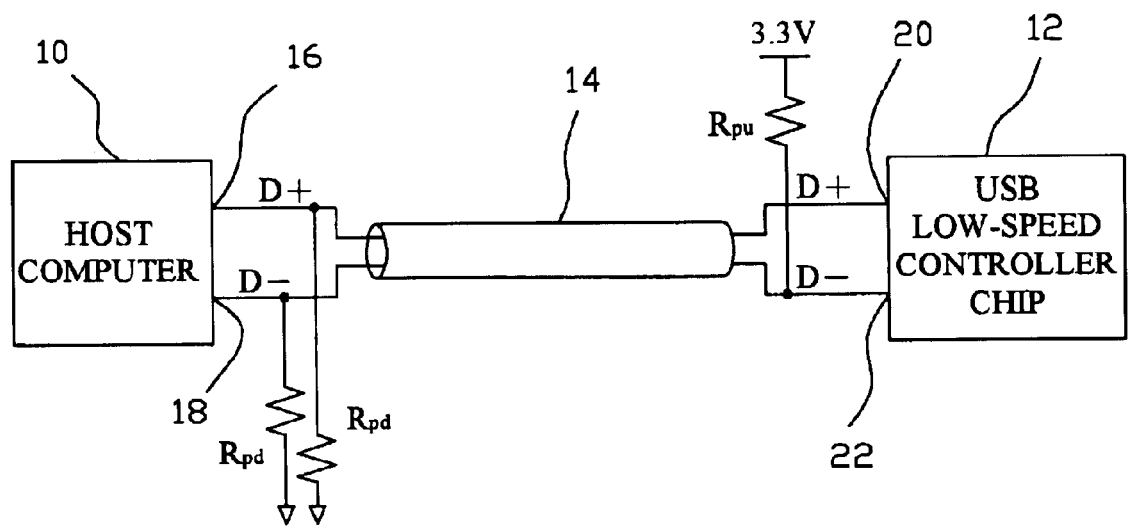
FIG. 1 shows the manner of a conventional USB low-speed device connected to a host computer system.
Figure 2:
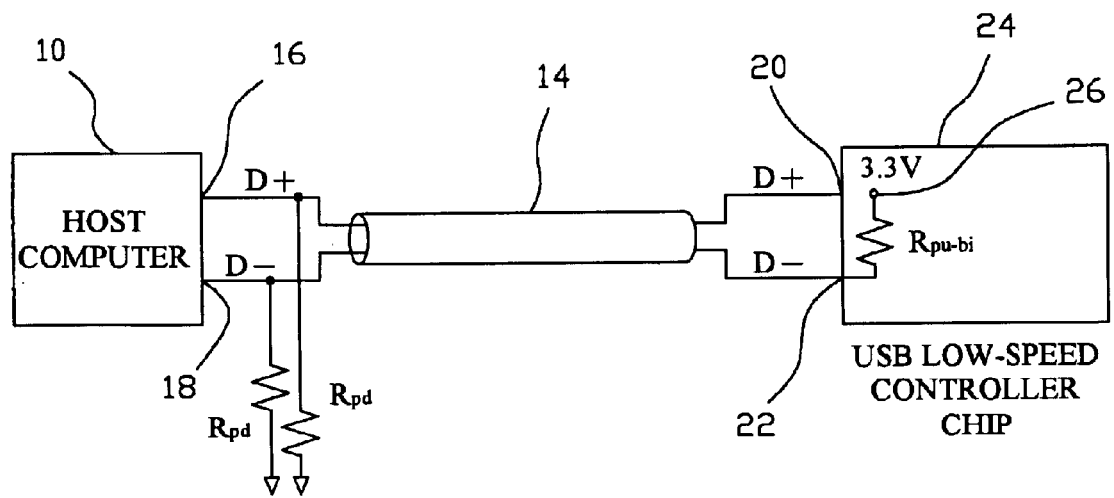
FIG. 2 shows an embodiment USB interface controller chip connected to a host computer system according to the present invention.

FIG. 2 shows one embodiment arrangement of the present invention, in which the D+ ports 16 and 20, and D− ports 18 and 22 of the host computer 10 and a USB low-speed device controller chip 24 are connected together by a cable 14 as in the prior art connection, and the USB low-speed device controller chip 24 has a built-in pull-up resistor $R_{pu-bi}$ of 1.5 KΩ connected between the D− port 22 and a power node 26 connected with a supply voltage of 3.3V, in addition to the pull-down resistors $R_{pd}$ of 15 KΩ connected from the USB ports 16 and 18, respectively, to ground at the host computer 10 side. However, the tolerance range of the pull-up resistor $R_{pu-bi}$ could be up to or more than 20%.

According to the definition in USB specification, a threshold voltage $V_{IH}=2.0$ V is defined for the USB port, i.e., it is ensured that logic "1" will be determined for the level of the on-line signal by a logical circuit as long as it is larger than 2.0 V. The tolerance range defined by the USB standard for the pull-down resistor $R_{pd}$ of 15KΩ is also 5%, thereby the lowest value of the pull-down resistor $R_{pd}$ is $$R_{pd(min)}=15\ K\Omega\times(1-5\%)=14.25\ K\Omega.$$

While setting the tolerance of the pull-up resistor $R_{pu-bi}$ to be 20%, that is, $$R_{pu-bi(max)}=1.5\ K\Omega\times(1+20\%)=1.8\ K\Omega,$$

the pull-up voltage according to the definition in the USB specification is 3.0–3.6 V. When the pull-up resistor $R_{pu-bi\ (max)}$ is connected to the lowest pull-up voltage in the worst case of 3.0V, it is known by calculation that the lowest voltage of the D− signal divided by the pull-up resistor $R_{pu-bi\ (max)}$ and the pull-down resistor $R_{pd\ (min)}$ in the USB idle mode is 2.66 V, which is still greater than the threshold definition $V_{IH}=2.0$ V significantly. As a result, the application of the built-in resistor $R_{pu-bi\ (max)}$ with the tolerance of 20% to the USB pull-up resistor $R_{pu}$ of 1.5KΩ may be practical. With further calculation, it could be known that the pull-up resistor $R_{pu}$ must be more than 7 KΩ, then the determination of USB for the signal level could be affected.

Further, as mentioned in the USB specification, the signal of the low-speed device D−/full-speed device D+ must be pulled up to $V_{IH}$, i.e., 2.0 V, by the pull-up resistor $R_{pu}$ within 2.5 μs after power-on and reset. To satisfy such requirement, for instance, the pull-up resistor $R_{pu}$ must not be greater than 4.6 KΩ in case of a load capacitor $C_L$=200–600 pf on the D+/D− signal port. The detailed calculation is given as followed.

The RC step response can be described as $$V(t) = 3.3 \times \left(1 - e^{\frac{-t}{\tau}}\right)$$

where τ is RC time constant. Thus, at time t=2.5 μs, $$V(2.5u) = V_{IH} = 2.0 = 3.3 \times \left(1 - e^{\frac{-2.5u}{RC}}\right)$$

and $$2.5 \ \mu s \approx 0.9 RC = 0.9 \times R_{pu} \times 600 \ p,$$

so that it is obtained $$R_{pu} \approx 4.6 \ K\Omega.$$

Moreover, as the resistance of the pull-up resistor $R_{pu}$ becomes lower, the rising time of the rising-edge of the low-speed device D− signal/full-speed device D+ signal will become faster, resulting in that the crossover voltage will exceed the range of 1.3–2.0 V defined by the USB specification. As such, the lower limit thereof should depend upon the compensation capability of the output buffers in the USB transceiver.

It is known from the above embodiment illustration the normal operation of the chip 24 in the USB transmission scheme could be ensured as long as the largest resistance of the built-in pull-up resistor $R_{pu-bi}$ of 1.5 KΩ for the USB low-speed device controller chip 24 does not exceed 4.6 KΩ (approximately 1.5 KΩ×306%) and the smallest one will not result in a rising time of the crossover voltage or rising-edge of signal exceeding the range defined by the USB specification.

As appreciated by those skilled in the art, the power source supplied to the pull-up resistor $R_{pu-bi}$ could be served by a voltage source of electrical circuit embedded in the controller chip 24 that transforms an external power source to an appropriate voltage, for instance, a supply voltage of 5 V transformed by the chip to a supply voltage of 3.3 V in advance and, then connected to the power node 26 to which the pull-up resistor $R_{pu-bi}$ is connected. In other words, the power node to which the pull-up resistor $R_{pu-bi}$ is connected is an arrangement to supply the voltage to the pull-up resistor $R_{pu-bi}$, not necessarily connected to an external power source directly.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A USB interface controller formed on an integrated circuit chip comprising:
   a pair of signal ports extending therefrom for being connected with a pair of USB signals from external to the controller chip;
   a power node defined on the chip for being connected with a supply voltage; and
   a built-in pull-up resistor integrated on the controller chip to be connected between the power node and one of the pair of signal ports, the pull-up resistor having a resistance with a tolerance larger than 5%.

2. The chip of claim 1, wherein the pull-up resistor has a nominal resistance of 1.5 KΩ.

3. The chip of claim 1, wherein the resistance of the pull-un resistor has a maximum value of 4.6 KΩ.

4. The chip of claim 1, wherein the one of the pair of signal ports is a D+ port of a USB interface.

5. The chip of claim 1, wherein the one of the pair of signal ports is a D− port of a USB interface.

6. A USB interface device comprising:
   a USB controller defined by an integrated circuit chip, the chip having formed thereon at least first and second signal ports for respective interconnection with external USB signal lines;
   the chip including a power node for interconnection with a supply voltage; and,
   the chip having integrated therein an internal pull-up resistor extending between the power node and at least the first signal port, the pull-up resistor having a resistance with a tolerance larger than 5%.

7. The device as recited in claim 6, wherein resistance of the pull-up resistor has a maximum value of 4.6 KΩ.

8. The device as recited in claim 7, wherein the first signal port forms a D+ port of a USB interface.

9. The device as recited in claim 7, wherein the first signal port forms a D− port of a USB interface.

* * * * *